US009702293B2

(12) United States Patent
Fujie et al.

(10) Patent No.: US 9,702,293 B2
(45) Date of Patent: Jul. 11, 2017

(54) DIAGNOSTIC DEVICE

(71) Applicant: ISUZU MOTORS LIMITED, Tokyo (JP)

(72) Inventors: Hidekazu Fujie, Yamato (JP); Tadashi Uchiyama, Kamakura (JP); Satoshi Hanawa, Fujisawa (JP); Naoto Murasawa, Yamato (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/021,456

(22) PCT Filed: Sep. 18, 2014

(86) PCT No.: PCT/JP2014/074687
§ 371 (c)(1),
(2) Date: Mar. 11, 2016

(87) PCT Pub. No.: WO2015/041289
PCT Pub. Date: Mar. 26, 2015

(65) Prior Publication Data
US 2016/0222861 A1    Aug. 4, 2016

(30) Foreign Application Priority Data
Sep. 18, 2013   (JP) .................................. 2013-193011

(51) Int. Cl.
*F01N 3/00*    (2006.01)
*F01N 3/02*    (2006.01)
(Continued)

(52) U.S. Cl.
CPC ............ *F01N 11/002* (2013.01); *F01N 3/103* (2013.01); *F01N 9/00* (2013.01); *F01N 11/00* (2013.01);
(Continued)

(58) Field of Classification Search
CPC ...... F01N 11/00; F01N 11/002; F01N 13/009; F01N 2550/02; F01N 2590/08;
(Continued)

(56) References Cited

U.S. PATENT DOCUMENTS

2002/0197721 A1   12/2002   Kinugawa et al.
2005/0188681 A1    9/2005   Emi et al.
(Continued)

FOREIGN PATENT DOCUMENTS

JP    2003-106140    4/2003
JP    2004-138014    5/2004
(Continued)

OTHER PUBLICATIONS

International Preliminary Report on Patentability dated Mar. 22, 2016 in corresponding International Patent Application No. PCT/JP2014/074687.
(Continued)

*Primary Examiner* — Phutthiwat Wongwian
*Assistant Examiner* — Diem Tran
(74) *Attorney, Agent, or Firm* — Staas & Halsey LLP

(57) ABSTRACT

A diagnostic device includes: a DOC for oxidizing hydrocarbon (HC) contained in an exhaust gas; a first sensor for detecting an exhaust gas temperature at a DOC inlet; a second sensor for detecting an exhaust gas temperature at a DOC outlet; a third sensor for detecting ambient temperature; an HC heat generation rate calculation unit which calculates, based on detection values of the first and second sensors, a difference in an exhaust gas heat quantity between upstream and downstream sides of the DOC, calculates, based on the detection values of the three sensors, a heat loss quantity released to outside air from the DOC, and adds the heat loss quantity and the exhaust gas heat quantity difference to calculate a heat generation quantity of HC in the
(Continued)

DOC; and a DOC deterioration determination unit which determines, based on the calculated HC heat generation quantity, deterioration of the DOC.

4 Claims, 4 Drawing Sheets

(51) Int. Cl.
    *F01N 11/00*     (2006.01)
    *F01N 3/10*     (2006.01)
    *F01N 13/00*     (2010.01)
    *F01N 9/00*     (2006.01)
    *F01N 3/021*     (2006.01)
    *F01N 3/023*     (2006.01)
    *F01N 3/025*     (2006.01)

(52) U.S. Cl.
    CPC ............ *F01N 13/009* (2014.06); *F01N 3/021* (2013.01); *F01N 3/023* (2013.01); *F01N 3/0253* (2013.01); *F01N 2430/06* (2013.01); *F01N 2550/02* (2013.01); *F01N 2590/08* (2013.01); *F01N 2610/03* (2013.01); *F01N 2900/1631* (2013.01); *Y02T 10/47* (2013.01)

(58) Field of Classification Search
    CPC ......... F01N 2610/03; F01N 2900/1631; F01N 3/103; F01N 9/00; Y02T 10/47
    USPC .................................. 60/276, 277, 297, 311
    See application file for complete search history.

(56) References Cited

U.S. PATENT DOCUMENTS

| | | |
|---|---|---|
| 2013/0098146 A1 | 4/2013 | Shibata et al. |
| 2013/0269427 A1 | 10/2013 | Nagaoka et al. |

FOREIGN PATENT DOCUMENTS

| | | |
|---|---|---|
| JP | 2009-162177 | 7/2009 |
| JP | 2010-112220 | 5/2010 |
| WO | WO 2011/135710 A1 | 11/2011 |

OTHER PUBLICATIONS

Espacenet Abstract, Publication No. JP 2003-106140, Published Apr. 9, 2003.
Japan Platform for Patent Information, English Abstract of Japanese Publication No. 2010-112220 published May 20, 2010.
Japan Platform for Patent Information, English Abstract of Japanese Publication No. 2009-162177 published Jul. 23, 2009.
Japan Platform for Patent Information, English Abstract of Japanese Publication No. 2004-138014 published May 13, 2004.
International Search Report mailed Nov. 4, 2014 corresponding International Application No. PCT/JP2014/074687.

$$C_{act} = Q_{out} - Q_{in} + Q_{lost}$$

DIAGNOSTIC DEVICE

CROSS-REFERENCE TO RELATED APPLICATIONS

This application is a U.S. National Stage Application, which claims the benefit under 35 U.S.C. §371 of PCT International Patent Application No. PCT/JP2014/074687, filed Sep. 18, 2014, which claims the foreign priority benefit under 35 U.S.C. §119 of Japanese Patent Application No. 2013-193011, filed Sep. 18, 2013, the contents of which are incorporated herein by reference.

TECHNICAL FIELD

The present invention relates to a diagnostic device, and in particular to diagnosis of a deterioration of an oxidation catalyst arranged in an exhaust system of an internal combustion engine.

BACKGROUND ART

As an exhaust gas purifying catalyst to be arranged in an exhaust system (exhaust gas passage) of a diesel engine or the like, and an oxidation catalyst (Diesel Oxidation Catalyst: DOC) for oxidizing hydrocarbons (HC) and nitrogen monoxide (NO) contained in an exhaust gas is known. A diesel particulate filter (DPF) for collecting particulate matter (PM) contained in the exhaust gas and the like is also known.

In the DPF, when an amount of accumulated PM reaches a predetermined value, unburnt fuel (HC) is supplied to the DOC arranged upstream of the DPF and is oxidized to elevate the temperature of the exhaust gas up to a PM combustion temperature such that the PM is burned and removed. This is so-called forced regeneration. Therefore, when the capability of the DOC to oxidize HC (HC oxidation capability of the DOC) is deteriorated, the burning and removal of the PM accumulated in the DPF by the forced regeneration would become insufficient. A deterioration in the regenerating capability of the DPF may cause a shortened interval between regenerating operations, an increase in the exhaust gas pressure, and the like. As a result, a reduction in the fuel efficiency or the like may occur. It is therefore preferable to diagnose the HC oxidation capability of the DOC on board.

According to a technique disclosed in Patent Literature Document 1, for example, exhaust gas temperature sensors are arranged on both upstream and downstream sides of the DOC, and an amount of heat generated by the oxidation in the DOC is estimated on the basis of a difference between exhaust gas temperatures measured by these exhaust gas temperature sensors to diagnose the HC oxidation capability of the DOC.

LISTING OF REFERENCES

Patent Literature Document 1: Japanese Patent Application Laid-Open Publication No. 2003-106140

The DOC is typically housed in a catalyst casing of an exhaust pipe extending along a lower portion of a vehicle body, and therefore, the oxidation heat in the DOC is partially dissipated to the outside air (ambient air) due to an influence of wind caused by a travelling vehicle or the like. Therefore, the conventional technique of estimating the amount of heat generated in the DOC on the basis of only the difference between the exhaust gas temperatures on the upstream and downstream sides of the DOC may fail to make a precise diagnosis because this technique does not take into account an amount of lost heat which is dissipated from the DOC to the outside air.

SUMMARY OF THE INVENTION

A diagnostic device disclosed herein is configured to perform a precise diagnosis of deterioration of the DOC.

A diagnostic device disclosed herein includes: an oxidation catalyst arranged in an exhaust system of an internal combustion engine to oxidize at least hydrocarbons contained in an exhaust gas; a first temperature detecting unit for detecting (measuring) an inlet exhaust gas temperature of the exhaust gas flowing into the oxidation catalyst; a second temperature detecting unit for detecting an outlet exhaust gas temperature of the exhaust gas flowing out of the oxidation catalyst; a third temperature detecting unit for detecting a temperature of the air outside the oxidation catalyst; a heat generation amount estimating unit for calculating a difference between an amount of heat of the exhaust gas on an upstream side of the oxidation catalyst and an amount of heat of the exhaust gas on a downstream side of the oxidation catalyst based on at least detection values of the first and second temperature detecting units, calculating an amount of heat loss from the oxidation catalyst to the outside air based on at least the detection values of the first, second and third temperature detecting units, and adding up the difference between the amounts of heat of the exhaust gas and the amount of heat loss to estimate an amount of heat generated by the hydrocarbons in the oxidation catalyst; and a determination unit for determining a deterioration state (level) of the oxidation catalyst on the basis of the estimated amount of generated heat.

The diagnostic device disclosed herein is capable of performing a precise diagnosis of the deterioration of the DOC.

DETAILED DESCRIPTION

Figure 1:
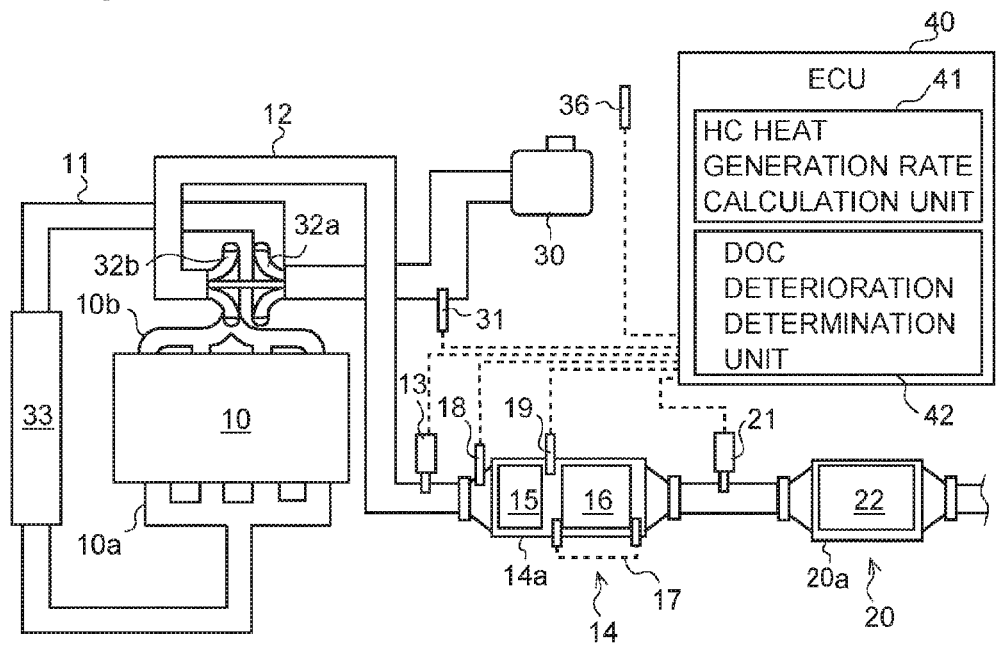
FIG. 1 is a schematic overall configuration diagram illustrating an intake and exhaust system of an engine to which a diagnostic device according to an embodiment of the present invention is applied.

Hereinafter, a diagnostic device according to an embodiment of the present invention will be described with reference to the accompanying drawings. Same parts are designated by same reference numerals, and such parts have same names and functions. Accordingly, redundant detailed descriptions of such parts will be omitted.

Referring to FIG. 1, a diesel engine (hereinafter simply referred to as "engine") 10 has an intake manifold 10a and an exhaust manifold 10b. An intake passage 11 for introducing fresh air is connected to the intake manifold 10a, and an exhaust passage 12 for discharging an exhaust gas to the atmosphere is connected to the exhaust manifold 10b.

On the intake passage 11, disposed are an air cleaner 30, a mass air flow ("MAF") sensor 31, a compressor 32a of a turbo charger, and an intercooler 33. The air cleaner 30, the MAF sensor 31, the compressor 32a and the intercooler 33 are arranged in this order from the upstream side. On the exhaust passage 12, disposed are a turbine 32b of the turbo charger, an upstream aftertreatment device 14, and a downstream aftertreatment device 20. The turbine 32b, the upstream aftertreatment device 14 and the downstream aftertreatment device 20 are arranged in this order from the upstream side. It should be noted that in FIG. 1 reference numeral 36 denotes an outside air temperature sensor. The outside air temperature sensor 36 is a preferable example of a third temperature detecting unit according to the present invention.

The upstream aftertreatment device 14 includes a cylindrical catalyst casing 14a, a DOC 15, and a DPF 16. The DOC 15 is arranged upstream of the DPF 16 in the catalyst casing 14a. In addition, an in-pipe injector (injector for injecting a fuel into the exhaust pipe) 13 is arranged on an upstream side of the DOC 15, a DOC inlet temperature sensor 18 is arranged on the upstream side of the DOC 15, and a DOC outlet temperature sensor 19 is arranged on a downstream side of the DOC 15. A differential pressure sensor 17, which is used to detect (measure) a difference in pressure between the upstream and downstream sides of the DPF 16, is arranged across the DPF 16.

The in-pipe injector (exhaust pipe injector) 13 injects unburnt fuel (HC) into the exhaust passage 12 in response to an instruction signal received from an electronic control unit (hereinafter referred to as "ECU") 40. It should be noted that if post injections by way of multiple injections of the engine 10 are employed, the in-pipe injector 13 may be dispensed with.

The DOC 15 includes, for example, a ceramic support having a cordierite honeycomb structure or the like, and catalytic components supported on a surface of the ceramic support. Once HC is supplied to the DOC 15 by the in-pipe injector 13 or the post injection, the DOC 15 oxidizes HC to raise the temperature of the exhaust gas. In addition, the DOC 15 oxidizes NO in the exhaust gas to $NO_2$ to increase the ratio of $NO_2$ to NO in the exhaust gas.

The DPF 16 includes, for example, a large number of cells defined by porous partitions and arranged along the flow direction of the exhaust gas, with the upstream and downstream sides of the cells being plugged alternately. In the DPF 16, PM in the exhaust gas is collected in pores of the partitions and on surfaces of the partitions. When an amount of accumulated PM reaches a predetermined value, so-called forced regeneration is carried out, i.e., the accumulated PM is burnt for removal. The forced regeneration is carried out by supplying the unburnt fuel (HC) into the DOC 15 through the in-pipe injector 13 or the post injection, and raising the temperature of the exhaust gas flowing into the DPF 16 up to a PM combustion temperature (for example, about 600 degrees C.). The amount of accumulated PM can be obtained (known) from a sensor value of the differential pressure sensor 17.

The DOC inlet temperature sensor 18 is an example of a first temperature detecting unit according to the present invention, and detects the temperature of the upstream exhaust gas flowing into the DOC 15 (hereinafter referred to as "inlet exhaust gas temperature"). The DOC outlet temperature sensor 19 is an example of a second temperature detecting unit according to the present invention, and detects the temperature of the downstream exhaust gas flowing out of the DOC 15 (hereinafter referred to as "outlet exhaust gas temperature"). The detection values of the temperature sensors 18 and 19 are supplied to the ECU 40, which is electrically connected to the sensors 18 and 19.

The downstream aftertreatment device 20 includes a cylindrical casing 20a, a urea solution injector 21, and an SCR catalyst 22 disposed in the casing 20a. The urea solution injector 21 is arranged upstream of the SCR catalyst 22.

The urea solution injector 21 injects a urea solution (urea water) from a urea solution tank (not shown) into the exhaust passage 12 between the upstream aftertreatment device 14 and the downstream aftertreatment device 20 in accordance with an instruction signal received from the ECU 40. The injected urea solution is hydrolyzed to $NH_3$ with the exhaust gas heat, and $NH_3$ is supplied to the SCR 22 on the downstream side as a reducing agent.

The SCR catalyst 22 includes, for example, a ceramic support having a honeycomb structure, and iron zeolite supported on a surface of the ceramic support. The SCR catalyst 22 absorbs $NH_3$ supplied as the reducing agent, and the absorbed $NH_3$ reduces NOx contained in the exhaust gas passing therethrough for purification.

The ECU 40 performs various types of control, such as control over the engine 10 and the in-pipe injector 13, and includes a CPU, a ROM, a RAM, input ports, output ports, and other elements which are known in the art. In addition, the ECU 40 includes an HC heat generation rate calculation unit 41 and a DOC deterioration determination unit 42 as functional components thereof. It is assumed in the following description that all of these functional components are included in the ECU 40, which is a single piece of hardware, but one or more of these functional components may be included in a separate piece of hardware.

The HC heat generation rate calculation unit 41 is an example of a heat generation amount estimation unit according to the present invention, and calculates a heat generation rate of HC oxidized in the DOC 15 at the time of a forced regeneration in the DPF 16. A procedure of the calculation of the heat generation rate will be described in detail below.

Figure 2:
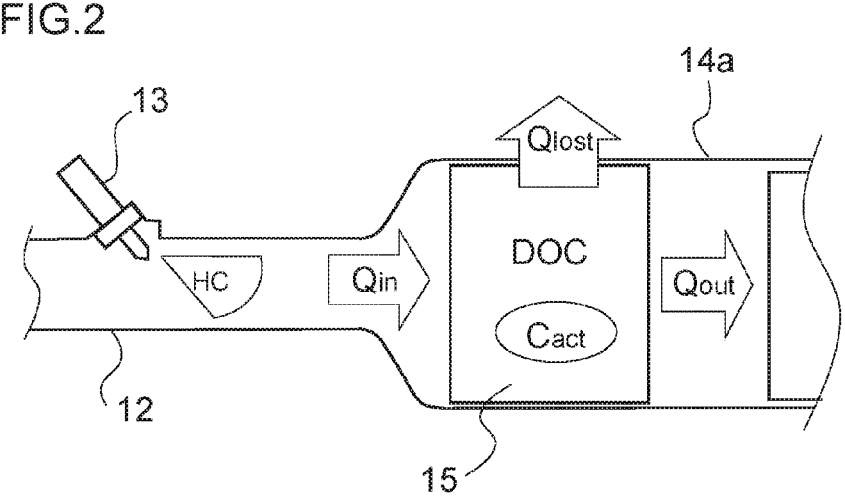
FIG. 2 is a schematic diagram useful to explain conservation of energy generated by oxidation of HC supplied to a DOC.

As shown in FIG. 2, an actual amount $C_{act}$ of heat generated by HC supplied from the in-pipe injector 13 into the DOC 15 at the time of the forced regeneration can be obtained by adding the amount $Q_{lost}$ of heat loss, i.e., an amount of heat dissipated from the DOC 15 to the outside air, to an exhaust gas energy difference $\Delta Q$, which is a difference between an energy $Q_{in}$ of the exhaust gas on the upstream side of the DOC 15 and an energy $Q_{out}$ of the exhaust gas on the downstream side of the DOC 15.

The energy Qin of the upstream exhaust gas is calculated on the basis of the following formula (1), and the energy $Q_{out}$ of the downstream exhaust gas is calculated on the basis of the following formula (2).

$$Q_{in} = c_{exh} \cdot m_{exh} \cdot T_{DOC\_in} \qquad \text{[Formula 1]}$$

$$Q_{out} = c_{exh} \cdot m_{exh} \cdot T_{DOC\_out} \qquad \text{[Formula 2]}$$

In the formulas (1) and (2), $C_{exh}$ represents specific heat of the exhaust gas, and $m_{exh}$ represents the flow rate of the exhaust gas, which is obtained from a detection value of the MAF sensor 31, the amount of fuel injection of the engine 10, and so on. It should be noted that the flow rate $M_{exh}$ of the exhaust gas may be obtained directly from an exhaust gas flow rate sensor (not shown) or the like. $T_{DOC\_in}$ represents the exhaust gas temperature at an inlet of the DOC 15, and is obtained by the DOC inlet temperature sensor 18. $T_{DOC\_out}$ represents the exhaust gas temperature at an outlet of the DOC 15, and is obtained by the DOC outlet temperature sensor 19.

It can be assumed that the amount $Q_{lost}$ of heat loss is a sum of an amount $Q_{natural}$ of heat loss caused by natural convection and an amount $Q_{forced}$ of heat loss caused by forced convection ($Q_{lost}=Q_{natural}+Q_{forced}$).

The amount $Q_{natural}$ of heat loss caused by the natural convection is calculated on the basis of the following formula (3).

$$Q_{natural} = h_n \cdot A_s \cdot (T_{DOC\_brick} - T_{ambient}) \qquad [\text{Formula 3}]$$

In the formula (3), $A_s$ represents an effective area of an outer circumferential surface of the DOC 15 (or an outer circumferential surface of that portion of the catalyst casing 14a in which the DOC 15 is arranged). $T_{DOC\_brick}$ represents the inside temperature of the DOC 15, and is calculated as the average of the inlet exhaust gas temperature $T_{DOC\_in}$ and the outlet exhaust gas temperature $T_{DOC\_out}$. $T_{ambient}$ represents the temperature of the outside air, and is obtained by the outside air temperature sensor 36. $h_n$ represents a heat transfer coefficient of natural convection, and is given by the following formula (4).

$$h_n = \frac{Nu_n \cdot k}{L_n} \qquad [\text{Formula 4}]$$

In the formula (4), k represents the thermal conductivity of the air. $L_n$ represents a characteristic length of the DOC 15, and is determined appropriately in accordance with, for example, the volume of the DOC 15. $Nu_n$ represents a Nusselt number for natural convection.

Usually, the DOC 15 has a column shape, and the catalyst casing 14a, in which the DOC 15 is received, has a substantially cylindrical shape. Therefore, the oxidation heat generated in the DOC 15 is presumably dissipated to the outside air through the entire cylindrical outer circumferential surfaces of the DOC 15 and the catalyst casing 14a. Assuming that heat dissipation by natural convection causes heat to transfer through the entire cylindrical outer circumferential surface with an axis of the cylindrical outer circumferential surface being horizontally oriented, the Nusselt number $Nu_n$ is given by the following formula (5), where $G_r$ represents the Grashof number, and $P_r$ represents the Prandtl number.

$$Nu_n = 0.53 \times (Gr \cdot Pr)^{0.25} \qquad [\text{Formula 5}]$$

The amount $Q_{force}$ of heat loss caused by the forced convection is calculated on the basis of the following formula (6).

$$Q_{forced} = h_f \cdot A_f (T_{DOC\_brick} - T_{ambient}) \qquad [\text{Formula 6}]$$

In the formula (6), $A_f$ represents the effective area of the outer circumferential surface of the DOC 15 (or the outer circumferential surface of that portion of the catalyst casing 14a in which the DOC 15 is arranged). $T_{DOC\_brick}$ represents the inside temperature of the DOC 15, and is calculated as the average of the inlet exhaust gas temperature $T_{DOC\_in}$ and the outlet exhaust gas temperature $T_{DOC\_out}$. $T_{ambient}$ represents the temperature of the outside air, and is obtained by the outside air temperature sensor 36. $h_f$ represents a heat transfer coefficient of the forced convection, and is given by the following formula (7).

$$h_f = \frac{Nu_f \cdot k}{L_f} \qquad [\text{Formula 7}]$$

In the formula (7), $L_f$ represents the characteristic length of the DOC 15, and is determined appropriately in accordance with, for example, the volume of the DOC 15. $Nu_f$ represents a Nusselt number of the forced convection.

Figure 3:
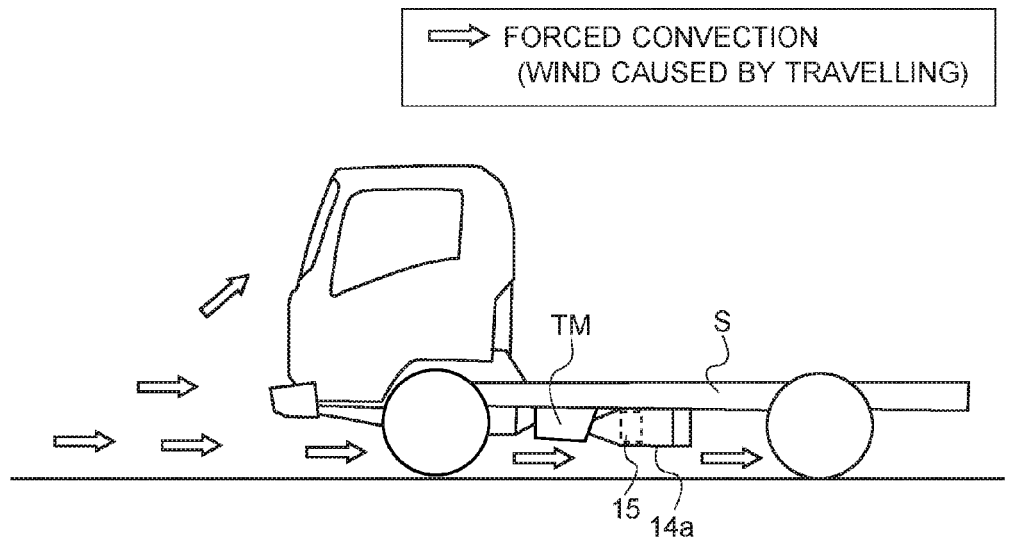
FIG. 3 is a schematic side view useful to explain a heat loss from the DOC due to an influence of forced convection.

As illustrated in FIG. 3, the catalyst casing 14a that receives the DOC 15 therein is typically fixed to a lower portion of a chassis frame S of a vehicle body, and a transmission TM and other elements are arranged in front of the catalyst casing 14a. Accordingly, a wind which flows from in front of the vehicle body into a space below the vehicle body while the vehicle is travelling can be assumed to be a planar turbulent flow which influences only a lower surface of the DOC 15 (or of the catalyst casing 14a). Therefore, the Nusselt number $Nu_f$ of the forced convection is given by the following formula (8), which is derived by solving a heat transfer equation for planar turbulence.

$$Nu_f = 0.037 \times Re^{0.8} \times Pr^{0.33} \qquad [\text{Formula 8}]$$

In the formula (8), Re represents the Reynolds number. The Reynolds number Re is given by the expression (9), where v represents the average velocity of the air, ρ represents the air density, L represents the characteristic length of the DOC 15, and μ represents a dynamic viscosity coefficient.

$$Re = \frac{v \cdot \rho \cdot L}{\mu} \qquad [\text{Formula 9}]$$

The HC heat generation rate calculation unit 41 adds the amount $Q_{lost}$ of heat loss, which is calculated on the basis of the formulas (3) to (9), to the exhaust gas energy difference $\Delta Q$ between the energy $Q_{in}$ of the exhaust gas on the upstream side, which is calculated on the basis of the expression (1), and the energy $Q_{out}$ of the exhaust gas on the downstream side, which is calculated on the basis of the expression (2), to calculate the actual amount $C_{act}$ of heat generated by HC in the DOC 15 at the time of the forced regeneration. The HC heat generation rate calculation unit 41 then divides the actual amount $C_{act}$ of heat generated by HC by a theoretical amount $G_{theo}$ of heat generated by an in-pipe injection (or a post injection) to calculate an actual HC heat generation rate $C_{ACT\%}$ in the DOC 15.

Figure 4:
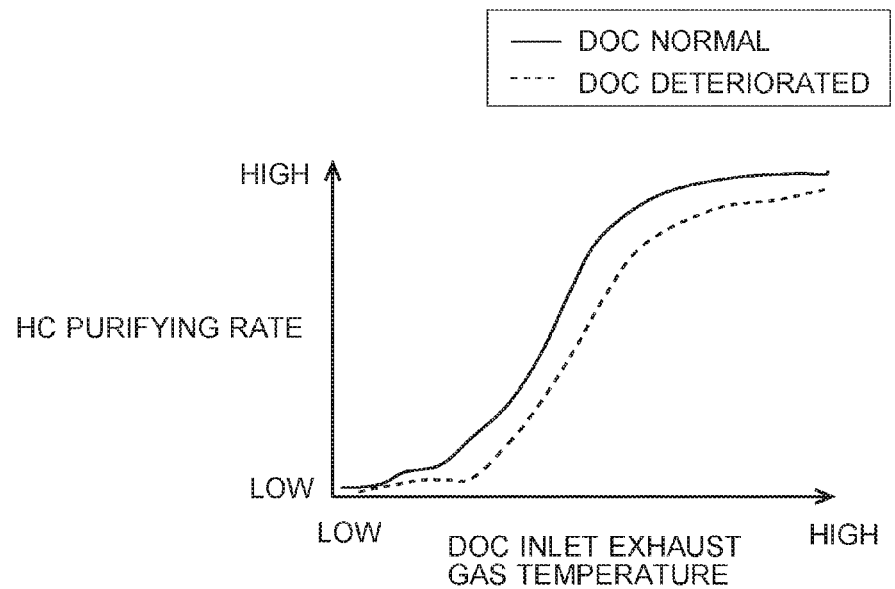
FIG. 4 is a comparison diagram of the HC oxidation capability (HC removing capability) of the DOC between a normal state and a deteriorated state.

The DOC deterioration determination unit 42 determines the state (level) of the deterioration of the DOC 15 on the basis of the actual HC heat generation rate $C_{ACT\%}$, which is calculated by the HC heat generation rate calculation unit 41. More specifically, the ECU 40 stores an HC heat generation rate threshold value $C_{STD\%}$ that indicates a heat generation rate when a specified amount of HC is substantially completely oxidized in the DOC 15. The HC heat generation rate threshold value $C_{STD\%}$ is prepared in advance by experiments or the like. The DOC deterioration determination unit 42 determines that the capability of the DOC 15 to oxidize HC (HC purifying capability of the DOC 15) is in a deteriorated state if a difference $\Delta C_\%$ between the HC heat generation rate threshold value $C_{STD\%}$ and the actual HC heat generation rate $C_{ACT\%}$ reaches a predetermined upper limit threshold value $\Delta C_{MAX}$ which indicates a deterioration of the DOC 15. It should be noted that the deteriorated state of the HC purification (or removing) capability of the DOC 15 refers to a state in which a current HC reduction rate of the DOC 15 is different from a normal HC purification rate of the DOC 15 (state in which a catalyst activation temperature is shifted to a higher temperature) due to, for example, aging or the like as illustrated in FIG. 4.

Figure 5:
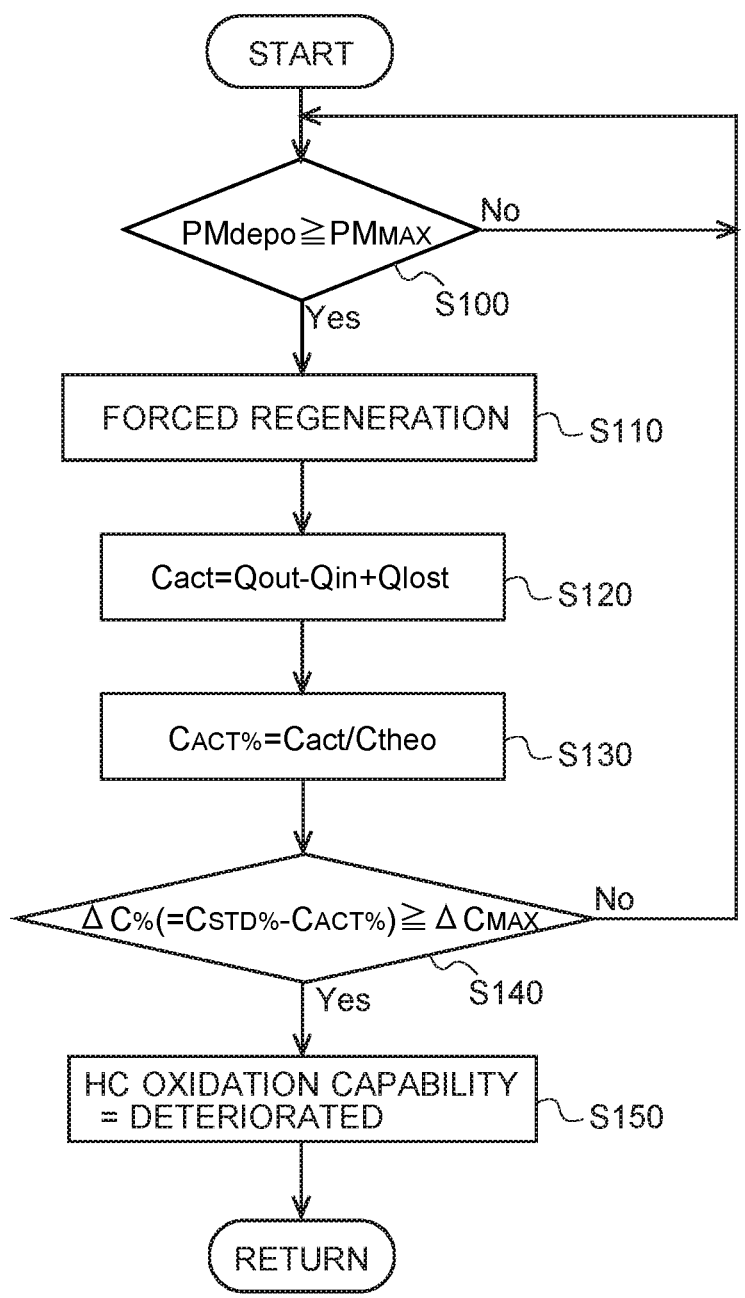
FIG. 5 is a flowchart illustrating control performed by the diagnostic device according to this embodiment.

Next, a control flow of the diagnostic device according to this embodiment will be described with reference to FIG. 5.

In Step 100 (hereinafter, Step is simply referred to as "S"), it is determined whether an amount $PM_{depo}$ of PM accumulated in the DPF 16 has reached an upper limit value $PM_{MAX}$ on the basis of, for example, the difference in pressure between the upstream and downstream sides of the DPF 16. If the amount $PM_{depo}$ of accumulated PM has reached the upper limit value $PM_{MAX}$, the control proceeds to S110.

In S110, the in-pipe injection by the in-pipe injector 13 (or the post injection) is started to perform the forced regeneration of the DPF 16.

In S120, the amount $Q_{lost}$ of heat loss, i.e., the amount of heat dissipated to the ambient air, is added to the exhaust gas energy difference $\Delta Q$, which is the difference between the energy $Q_{in}$ of the exhaust gas on the upstream side and the energy $Q_{out}$ of the exhaust gas on the downstream side, to calculate the actual amount $C_{act}$ of heat generated by HC in the DOC 15. In S130, the actual amount $C_{act}$ of heat generated by HC, which is calculated in S120, is divided by the theoretical amount $C_{theo}$ of heat to be generated to calculate the actual HC heat generation rate $C_{ACT\%}$.

In S140, the actual HC heat generation rate $C_{ACT\%}$, which is calculated in S130, is compared to the HC heat generation rate threshold value $C_{STD\%}$ to determine whether the DOC 15 is in the deteriorated state. If the difference $\Delta C_{\%}$ between the HC heat generation rate threshold value $C_{STD\%}$ and the actual HC heat generation rate $C_{ACT\%}$ has not yet reached the upper limit threshold value $\Delta C_{MAX}$, the control returns to S100. In other words, a determination as to the deterioration of the DOC 15 is suspended until a next forced regeneration. On the other hand, if the difference $\Delta C_{\%}$ has reached the upper limit threshold value $\Delta C_{MAX}$, it is determined in S150 that the HC oxidation capability of the DOC 15 (HC purifying capability of the DOC 15) is in the deteriorated state, and the control proceeds to "RETURN."

Next, beneficial effects of the diagnostic device according to this embodiment will be described below.

In the conventional device, the amount of heat generated by HC in the DOC is estimated on the basis of a difference between the temperature of the exhaust gas on the upstream side of the DOC and the temperature of the exhaust gas on the downstream side of the DOC to diagnose the deterioration state (level) of the HC oxidation capability. However, if the amount of heat generated by HC is estimated on the basis of only the difference between the temperature of the exhaust gas on the upstream side of the DOC and the temperature of the exhaust gas on the downstream side of the DOC, then an amount of lost heat that is dissipated from the DOC to the outside air is not taken into account. Accordingly, a problem arises, i.e., precise diagnosis is not possible.

On the contrary, the diagnostic device according to this embodiment is configured to add the amount $Q_{lost}$ of heat loss, i.e., the amount of heat dissipated from the DOC 15 to the outside air, to the exhaust gas energy difference $\Delta Q$, which is the difference between the energy $Q_{in}$ of the exhaust gas on the upstream side of the DOC 15 and the energy $Q_{out}$ of the exhaust gas on the downstream side of the DOC 15, to calculate the actual amount $C_{act}$ of heat generated by HC in the DOC 15.

Therefore, the diagnostic device according to this embodiment is able to calculate the actual amount $C_{act}$ of heat generated by HC in which the amount $Q_{lost}$ of heat loss to the outside is taken into account, and improve the accuracy in diagnosis of the deterioration of the DOC 15.

Moreover, in the diagnostic device according to this embodiment, the amount $Q_{lost}$ of heat loss from the DOC 15 to the outside air is calculated on the basis of the model formulas (3) to (5) including the heat transfer coefficient $h_n$ of the natural convection and model formulas (6) to (9) including the heat transfer coefficient $h_f$ of the forced convection. Of them, the heat transfer coefficient $h_n$ of the natural convection is set on the basis of the Nusselt number $Nu_n$ assuming that heat is dissipated through the entire cylindrical outer circumferential surface of the DOC 15, and the heat transfer coefficient $h_f$ of the forced convection is set on the basis of the Nusselt number $Nu_f$ assuming that the planar turbulent flow occurs and influences the lower surface of the DOC 15. Specifically, the amount $Q_{lost}$ of heat loss is calculated accurately on the basis of the model formulas which take into account the shapes of the DOC 15 and the catalyst casing 14a, the influence of the wind caused by the travelling vehicle, and so on.

Therefore, the diagnostic device of this embodiment is capable of precisely calculating the actual amount $C_{act}$ of heat generated by HC while taking the influence of the natural convection and the forced convection into account, and accurately diagnosing the capability of the DOC 15 to oxidize HC.

The diagnostic device of this embodiment is configured to carry out the diagnosis of the capability of the DOC 15 to oxidize HC when the forced regeneration of the DPF 16 is performed.

Accordingly, the diagnostic device according to this embodiment does not need the in-pipe injection (or the post injection) to be performed only for the sake of the diagnosis of the DOC 15. Thus, it is possible to effectively minimize the deterioration of the fuel efficiency.

It should be noted that the present invention is not limited to the above-described embodiments, and that changes and modifications can be made as appropriate without departing from the scope and spirit of the present invention.

Figure 6:
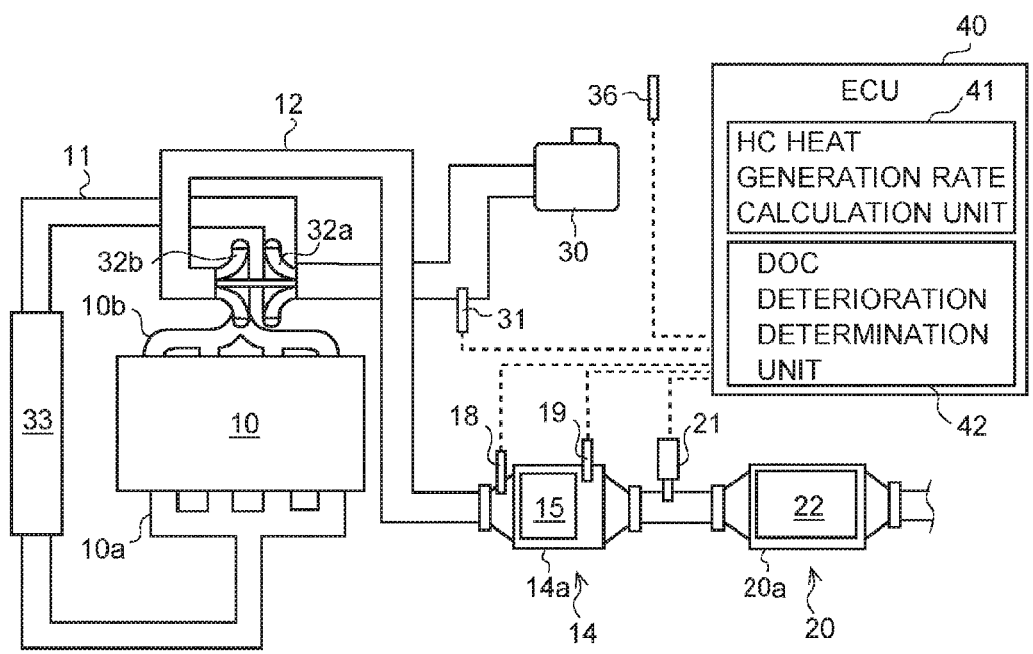
FIG. 6 is a schematic overall configuration diagram illustrating an intake and exhaust system of an engine to which a diagnostic device according to another embodiment of the present invention is applied.

For example, the present invention may be applied to a device as illustrated in FIG. 6 in which the upstream aftertreatment device 14 includes only the DOC 15, and neither the DPF 16 nor the in-pipe injector 13 is provided. In this configuration, S100 and S110 (forced regeneration of the DPF) in the flowchart of FIG. 5 are omitted, and the post injection by the engine 10, for example, is performed. In addition, the engine 10 is not limited to the diesel engine, and the present invention can be widely applied to other internal combustion engines, such as, for example, gasoline engines.

The invention claimed is:

1. A diagnostic device comprising:
   an oxidation catalyst, arranged in an exhaust system of an internal combustion engine, received in a cylindrical catalyst casing arranged at a lower portion of a vehicle body, and configured to oxidize at least hydrocarbons contained in an exhaust gas;
   a first temperature detecting sensor to detect an inlet exhaust gas temperature of the exhaust gas flowing into the oxidation catalyst;

a second temperature detecting sensor to detect an outlet exhaust gas temperature of the exhaust gas flowing out of the oxidation catalyst;

a third temperature detecting sensor to detect a temperature of an outside air of the oxidation catalyst; and a controller configured to calculate an exhaust gas heat difference between an amount of heat of the exhaust gas on an upstream side of the oxidation catalyst and an amount of heat of the exhaust gas on a downstream side of the oxidation catalyst based on at least detection values of the first and second temperature detecting sensors, calculate an amount of heat loss from the oxidation catalyst to the outside air based on at least the detection values of the first and second temperature detecting sensors and a detection value of the third temperature detecting sensor, add up the exhaust gas heat difference and the amount of heat loss to estimate an amount of heat generated by the hydrocarbons in the oxidation catalyst, and determine a state of deterioration of the oxidation catalyst based on the estimated amount of heat generated, wherein the calculation of the amount of heat loss is based on a heat transfer coefficient of natural convection and a heat transfer coefficient of forced convection, and wherein the heat transfer coefficient of the forced convection is set based on a Nusselt number assuming that forced convection causes a planar turbulent flow that influences a lower surface of the catalyst casing.

2. The diagnostic device according to claim 1, further comprising:

a filter arranged in the exhaust system on the downstream side of the oxidation catalyst to collect particulate matter contained in the exhaust gas, wherein the controller is further configured to estimate the amount of generated heat when forced regeneration that burns and removes the particulate matter accumulated in the filter is carried out.

3. The diagnostic device according to claim 1, wherein the internal combustion engine is a diesel engine, and the exhaust system of the internal combustion engine is an exhaust passage of the diesel engine.

4. The diagnostic device according to claim 3, wherein the oxidation catalyst is a diesel oxidation catalyst.

* * * * *